H. W. KA DELL.
STORAGE BATTERY.
APPLICATION FILED MAY 7, 1917.
1,276,771.
Patented Aug. 27, 1918.
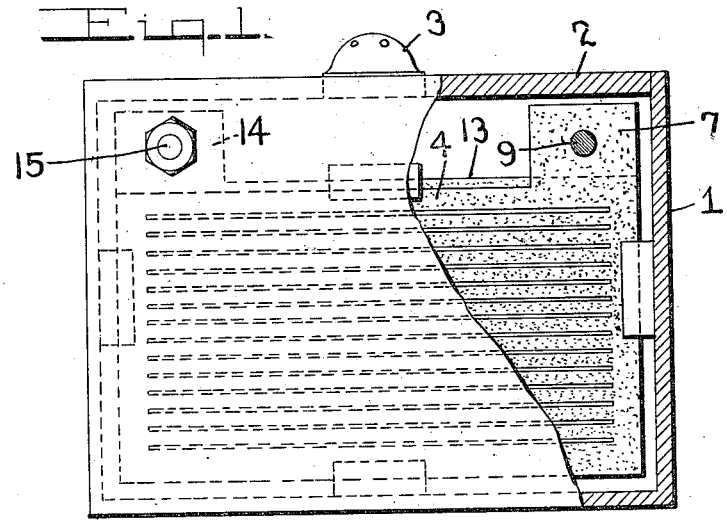
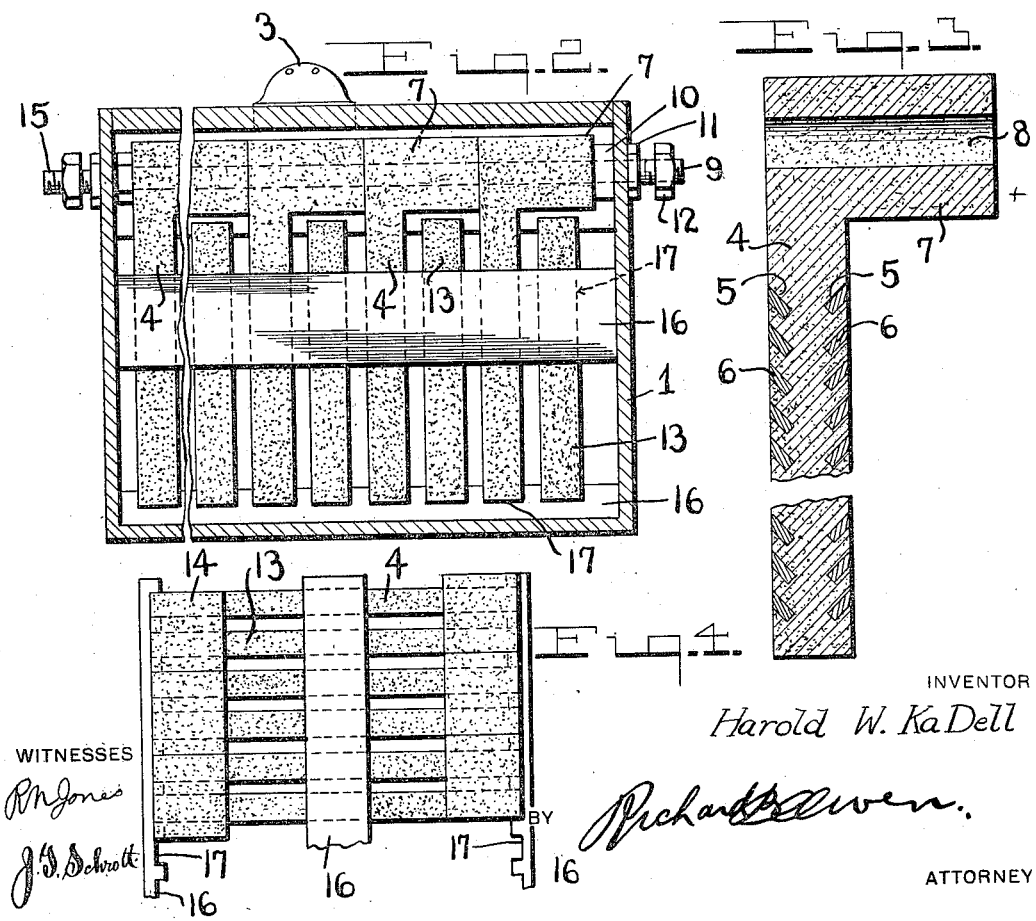
INVENTOR
Harold W. KaDell
WITNESSES
BY
ATTORNEY

UNITED STATES PATENT OFFICE.

HAROLD W. KA DELL, OF EDGELEY, NORTH DAKOTA.

STORAGE BATTERY.

1,276,771.

Specification of Letters Patent.

Patented Aug. 27, 1918.

Application filed May 7, 1917. Serial No. 166,927.

*To all whom it may concern:*

Be it known that I, HAROLD W. KA DELL, a citizen of the United States, residing at Edgeley, in the county of La Moure and State of North Dakota, have invented certain new and useful Improvements in Storage Batteries, of which the following is a specification.

My invention relates to improvements in storage cells, and consists in the constructions, combinations and arrangements herein described and claimed.

An object of my invention is to provide a storage cell wherein the positive and negative plates are formed of carbon instead of the usual lead, the positive plates being of the Faure type and consist of carbon sheets having the opposite surfaces recessed so that an active element such as oxid of lead may be smeared thereinto.

Another object of the invention is to provide a storage cell wherein the weight is greatly decreased by the use of carbon in constructing the positive and negative plates, the nature of the carbon being such that buckling of the plates and the constant obviation of local action between the plates being precluded.

Another object of the invention is to provide a storage cell having carbon positive plates of the Faure type upon which the active element is smeared in any suitable manner, the possibility of local action between the active element and the carbon plates being obviated because of the negative liability of chemical action on the carbon by ordinary electrolytes.

Another object of the invention is to provide a storage cell having positive and negative plates formed of carbon, hard rubber grids or spacing plates being provided for holding the positive and negative plates apart, so that excessive handling of the cell will not destroy the proper relationship of the plates.

Other objects and advantages will appear from the following specification, reference being had to the accompanying drawings, in which:—

Figure 1 is a side elevation of a storage cell illustrating the features of my invention, parts of the jar being broken away, Fig. 2 is a cross section through the jar showing the plates in end elevation, Fig. 3 is a detail cross section of one of the positive plates, and Fig. 4 is a detail plan view showing the correlation of the positive to the negative plates.

In carrying out my invention, I provide a jar 1 which may be made of any suitable material, such as is used in making storage battery jars and may consist of hard rubber, glass, or celluloid. A cover 2 is placed upon the jar 1. The cover 2 may be hermetically sealed so that the electrolyte in the jar 1 will not be spilled in the handling of the cell.

A vent 3 which consists of the perforated cap shown in Figs. 1 and 2 is screwed into an opening in the cover 2. The vent 3 permits the escape of gas which may be formed by the action of the elements of the storage cell.

A plurality of positive plates consisting of carbon sheets 4 are located in the jar 1. The positive plates 4 are recessed as at 5 as shown in Fig. 3, so that when an active element indicated 6 is smeared upon the opposite surfaces of the positive plates, it will be forced into the recesses 5 and held therein.

A connecting boss 7 is formed on one of the upper corners of each of the positive plates 4. The boss 7 of each positive plate 4 extends off to one side of the plate so that when the end of the boss abuts the next plate, a space is left between the positive plate as clearly shown in Fig. 2.

A bore 8 is formed in each of the bosses 7, so that a terminal bolt 9 may be passed through the bores of all of the bosses and secure them together. A washer 10 spaces the boss 7 of the end positive plate 4 from the adjacent side of the jar 1. A lock nut 11 binds the terminal bolt 9 firmly in position and also serves to provide a better electrical connection for one of the current wires when clamped in position by the binding nut 12.

A plurality of negative plates 13, formed of carbon, are located in the jar 1 and the negative plates 13 occupy the spaces between the positive plates 4 as shown in Fig. 2. The negative plates 13 are shaped similarly to the positive plates 4 in that they are provided with bosses 14 which also extend off to one side so that when the negative plates are assembled, they will be spaced equi-distantly apart so that the proper relationship of the positive and negative plates may be preserved.

A terminal bolt 15 passes through bores in the bosses 14 which are similarly located to the bores 8 in the bosses 7 in the positive plates.

Hard rubber spacing plates or strips 16 are fitted over the edges of the positive and negative plates, the strips 16 having evenly spaced kerfs 17 for the purpose of receiving the edges of the plates. While the strips 16 are described as being of hard rubber, the manufacture of these strips in other material such a wood or glass is an obvious expedient and the material of which the strips is made is immaterial, the only consideration being that the strips are of non-conducting material.

The manner of constructing and assembling the cell is as follows: The recesses 5 are formed in the positive plates in the course of manufacture, and the recesses 5 may be of any shape that will effectively hold the active element 6 in place on the plates.

The active element in this instance consists of a paste made of red lead minium and sulfuric acid. The paste is smeared in all of the recesses 5 of the positive plates 4.

All of the plates of the cell are assembled in the manner previously described, the strips 16 serving to hold each plate in its proper place. A common occurrence in using storage cells having lead plates, is to find that the plates become buckled when the cell is discharged too rapidly or when proper precautions to recharge the cell before it is too fully run-down, are not taken. The inherent nature of the carbon plates of my storage cell is such that they will not buckle, the danger of buckling being further guarded against by the holding strips 16.

The negative plates 13 are also formed with recessed surfaces similarly to the surfaces of the positive plates 4. In the instance of the negative plates however, litharge or the yellow oxid of lead which is first formed into a paste with sulfuric acid is smeared into the recesses. The positive and negative plates are first formed and placed in the jar. When an electrolyte of dilute sulfuric acid is poured into the jar around the positive and negative plates, the chemical reactions between the yellow oxid and the red oxid of lead on the negative and positive plates respectively, causes a flow of current.

While the construction and arrangement of the parts as illustrated in the drawing is of a generally preferred form, obviously modifications and changes therein may be made without departing from the spirit of the invention or the scope of the claim.

I claim:—

In a storage battery of the class described, the combination of a jar, a plurality of positive plates positioned within the jar and comprising elongated comparatively thick bodies, said plates having bosses formed thereon adjacent one end of each plate, said bosses projecting for a considerable distance beyond their respective plates in one direction, although terminating evenly with the side surfaces of the plates in the opposite direction, means passing through said bosses for binding the same in engagement with each other for supporting the positive plates in parallel spaced relation, whereby the plates at their opposite ends will be unobstructed, negative plates comprising elongated thickened bodies interposed between said positive plates and extending below the bosses of the positive plates, said negative plates having bosses formed thereabove, the boss of each negative plate extending for a considerable distance beyond the one side surface of the plate although terminating evenly with the other side surface thereof and being positioned within the jar adjacent the unobstructed end portions of the positive plates, whereby the bosses of the negative plate will extend above the unobstructed ends of the positive plates, and securing means passing through the bosses of the negative plates for binding engagement with each other, whereby said negative plates will be properly spaced from the positive plates.

In testimony whereof I affix my signature in presence of two witnesses.

HAROLD W. KA DELL.

Witnesses:
 L. A. STOUTENBURG,
 J. H. STOUTENBURG.